(12) United States Patent
Francus et al.

(10) Patent No.: US 11,858,320 B1
(45) Date of Patent: Jan. 2, 2024

(54) VEHICLE SUNVISOR ASSEMBLY

(71) Applicant: NISSAN NORTH AMERICA, INC., Franklin, TN (US)

(72) Inventors: Neil Andrew Francus, Plymouth, MI (US); David Smolik, Windsor (CA); Stacey Warner, Livonia, MI (US); Evan Alford, Waterford, MI (US)

(73) Assignee: NISSAN NORTH AMERICA, INC., Franklin, TN (US)

( * ) Notice: Subject to any disclaimer, the term of this patent is extended or adjusted under 35 U.S.C. 154(b) by 0 days.

(21) Appl. No.: 17/829,257

(22) Filed: May 31, 2022

(51) Int. Cl.
*B60J 3/02* (2006.01)
*B60R 21/055* (2006.01)

(52) U.S. Cl.
CPC ........... *B60J 3/0217* (2013.01); *B60J 3/0282* (2013.01); *B60R 21/055* (2013.01)

(58) Field of Classification Search
CPC ...................................................... B60J 3/023
See application file for complete search history.

(56) References Cited

U.S. PATENT DOCUMENTS

| 4,674,789 | A | 6/1987 | Watjer et al. |
| 8,038,199 | B2 | 10/2011 | Marcus et al. |
| 10,988,003 | B2 * | 4/2021 | Baxter .................... B60J 3/023 |

FOREIGN PATENT DOCUMENTS

DE      102010024831 A1 * 11/2011   .............. B60J 3/023

* cited by examiner

*Primary Examiner* — Joseph D. Pape
(74) *Attorney, Agent, or Firm* — Global IP Counselors, LLP (57) ABSTRACT

A vehicle sunvisor assembly includes a support structure, a sunvisor panel and an energy absorbing structure. The support structure is attached to a vehicle body structure adjacent to a first area of a windscreen. The sunvisor panel has first end and a second end. The first end is supported by the support structure and pivots about an upright axis and about an offset axis that is not parallel to the upright axis. The energy absorbing structure is installed to the vehicle body structure adjacent to a second area of the windscreen spaced apart from the first area and has a downwardly extending projection. A second attachment end of the sunvisor panel aligns with the downwardly extending projection. The energy absorbing structure is configured to absorb energy from an object moving in a forward direction contacting the sunvisor panel with the first attachment end being attached to the second attachment end.

14 Claims, 10 Drawing Sheets

VEHICLE SUNVISOR ASSEMBLY

BACKGROUND

Technical Field

The present disclosure generally relates to vehicle sunvisor assembly. More specifically, the present disclosure relates to vehicle sunvisor assembly that includes an energy absorbing structure that absorbs forward momentum (energy) in response to an object moving in a forward direction contacting a sunvisor panel imparting the forward momentum through the sunvisor panel to the energy absorbing structure.

Background Information

The automotive industry is constantly re-engineering and re-designing many of the components and structures within a vehicle in order to absorb energy in the form of forward momentum of objects within the vehicle. One area of re-designing interest relates to considering the effects of a sudden stop or impact event on very tall vehicle operators or tall passengers within a vehicle.

SUMMARY

One object of the present disclosure is to provide a sunvisor assembly with an energy absorbing structure that cushions or absorbs energy (forward momentum) from an object aligned with the sunvisor assembly.

In view of the state of the known technology, one aspect of the present disclosure is to provide a vehicle sunvisor assembly with a support structure, a sunvisor panel and an energy absorbing structure. The support structure is attached to a vehicle body structure of the vehicle adjacent to a first area of a windscreen of the vehicle body structure. The sunvisor panel has a first end and a second end. The first end is supported by the support structure for pivotal movement about an upright axis and movement about an offset axis that is not parallel to the upright axis, the second end having a first attachment end. The energy absorbing structure is installed to the vehicle body structure adjacent to a second area of the windscreen spaced apart from the first area. The energy absorbing structure has a downwardly extending projection with a second attachment end that aligns with the first attachment end with the sunvisor panel pivoted to the first attachment end. The energy absorbing structure is configured to absorb energy from an object moving in a forward direction contacting the sunvisor panel with the first attachment end being attached to the second attachment end.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
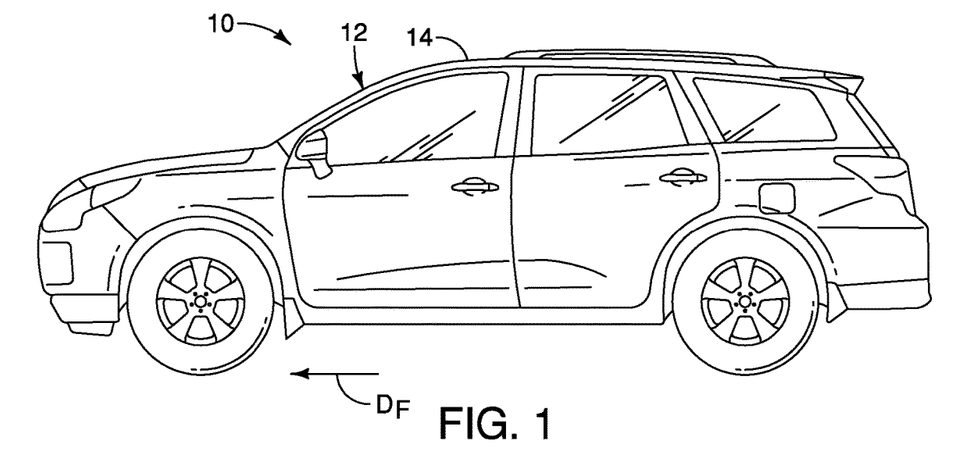
FIG. 1 is a side view of a vehicle in accordance with a first embodiment.
Figure 2:
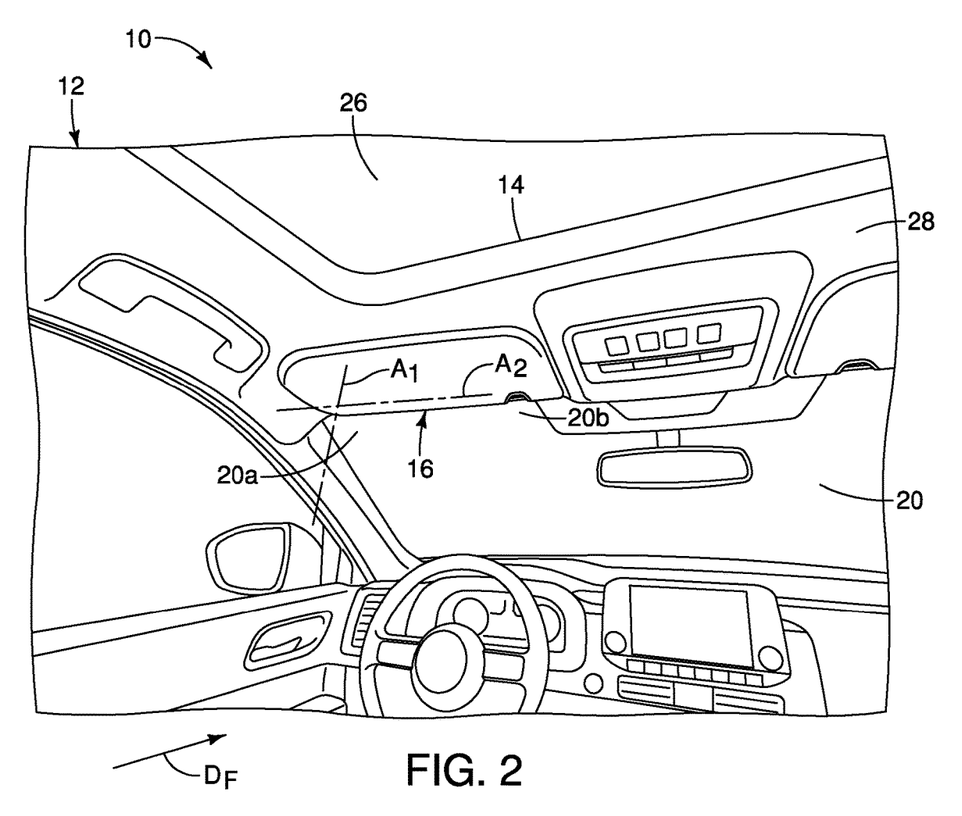
FIG. 2 is a view of an interior portion of the vehicle showing a windscreen, instrument panel, steering wheel, a headliner, a roof structure and a vehicle sunvisor assembly in accordance with the first embodiment.

Referring initially to FIGS. 1 and 2, a vehicle 10 having a vehicle body structure 12 that includes a roof structure 14 and a sunvisor assembly 16 is illustrated in accordance with a first embodiment.

The vehicle 10 defines a vehicle forward direction DF. The vehicle body structure 12 includes many conventional features, such as doors 18 and a windscreen 20 made of a laminated glass material. Since doors and windscreens are conventional vehicle structures and components, further description is omitted for the sake of brevity.

Figure 8:
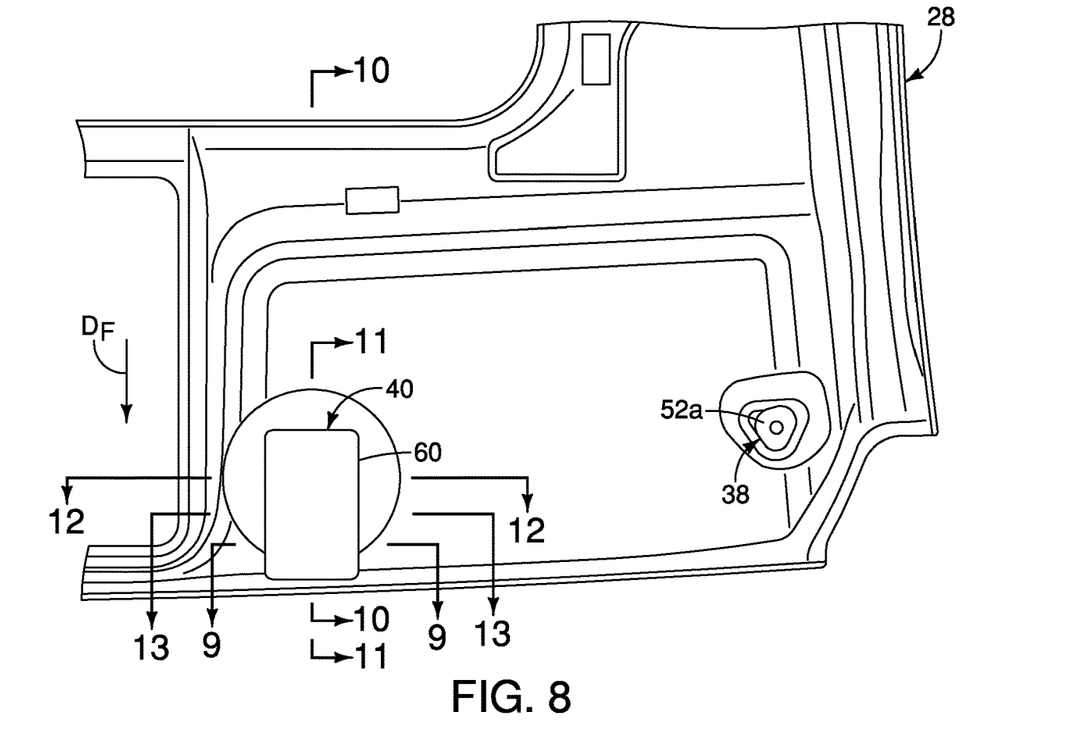
FIG. 8 is another top view of the portion of the headliner shown in FIGS. 6 and 7 with the energy absorbing structure and the support structure of the sunvisor assembly installed to the headliner in accordance with the first embodiment.

As shown in FIG. 2, the roof structure 14 includes a roof panel assembly 22, a plurality of roof bows (with only a forward roof bow 24 shown), an optional sunroof 26 and a headliner 28 that conceals the roof bows (forward roof bow 24) and roof panel assembly 22 from view within a passenger compartment within the vehicle body structure 12. The forward roof bow 24 extends from side-to-side within the roof structure 14 adjacent to the windscreen 20 (also referred to as a windshield). The forward roof bow 24 can also include several attachment areas that are described in greater detail below. The headliner 28 is installed along an interior side of the roof structure 14. As shown in FIG. 8, the headliner 28 includes an opening 30 and an elongated slot 32, as described further herein below.

The sunvisor assembly 16 (also referred to as the vehicle sunvisor assembly 16) is now described with reference to FIGS. 2, 3 and 4. The sunvisor assembly 16 includes a sunvisor panel 36, a support structure 38 and an energy absorbing structure 40.

Figure 3:
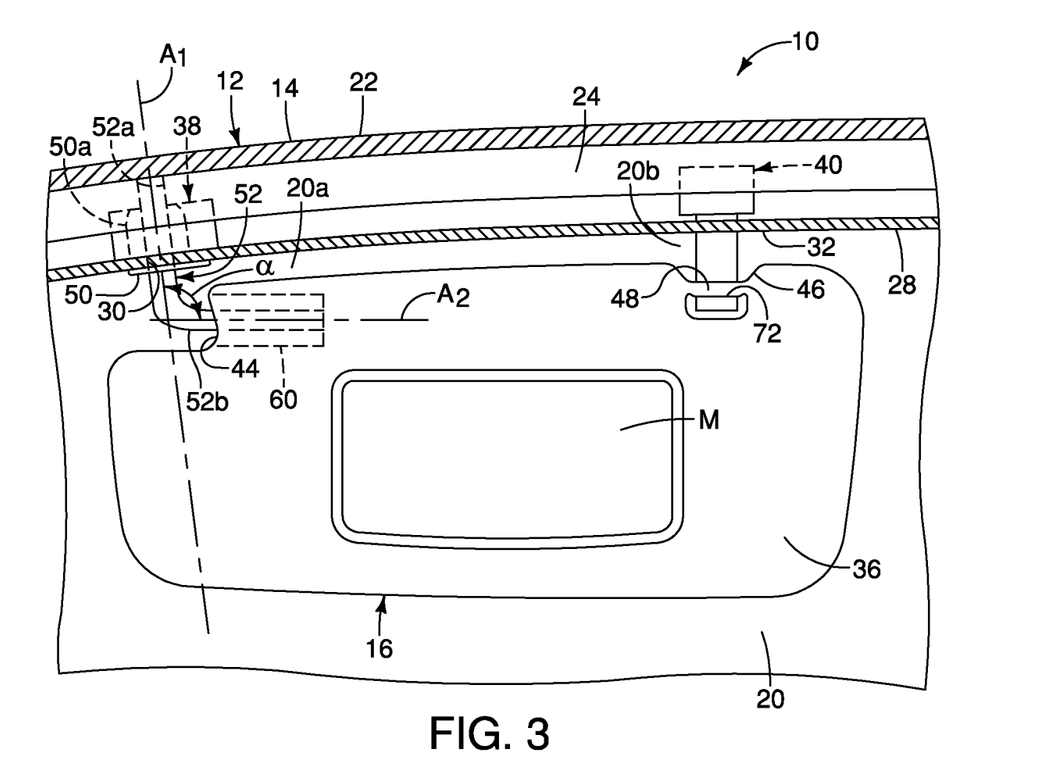
FIG. 3 is a rear cross-sectional view of a roof structure of the vehicle showing details of a support structure and an energy absorbing structure of the sunvisor assembly in accordance with the first embodiment.
Figure 4:
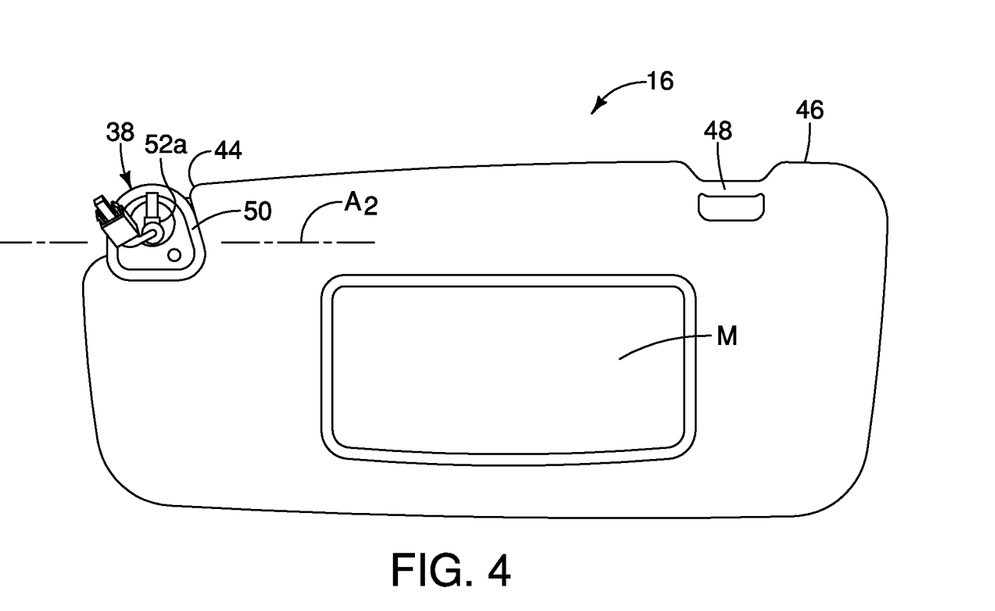
FIG. 4 is rear view of the sunvisor assembly showing a first end and a second end of a sunvisor panel of the sunvisor assembly in accordance with the first embodiment.
Figure 5:
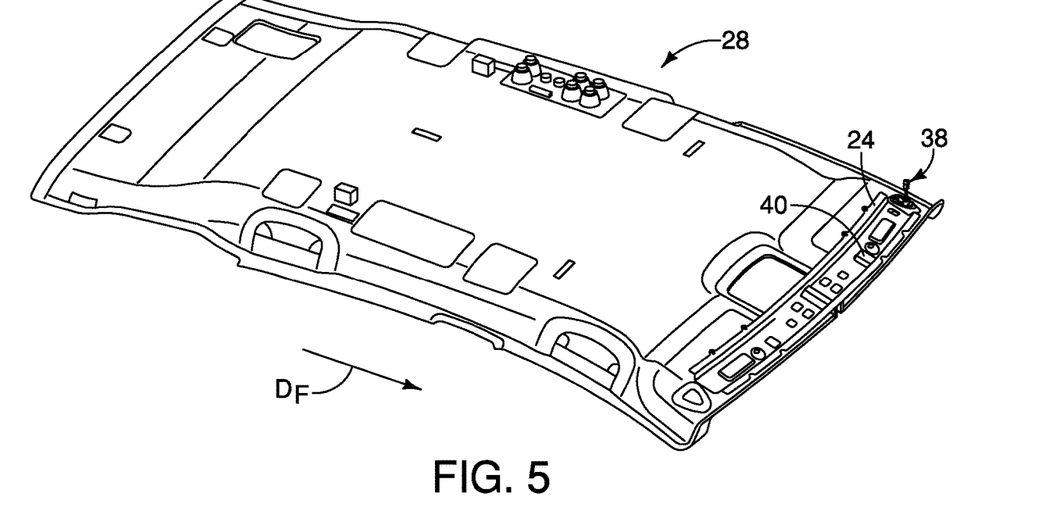
FIG. 5 is a perspective view of the headliner removed from the vehicle showing the energy absorbing structure and the support structure of the sunvisor assembly in accordance with the first embodiment.

As shown in FIGS. 3 and 4, the sunvisor panel 36 is a generally rectangular shaped element covered with a durable, decorative material. The sunvisor panel 36 can include a vanity mirror M and/or light (not shown). The sunvisor panel 36 defines a first end 44 and a second end 46. The sunvisor panel 36 with the support structure 38 are dimensioned and constructed to undergo pivotal movement an upright axis $A_1$, as described below. The first end 44 is a shaft receiving end that is further dimensioned and constructed to undergo pivotal movement about an offset axis $A_2$ that is not parallel to the upright axis $A_1$, as is also described in greater detail below. The second end 46 includes or defines a first attachment end 48 that is also described in greater detail below.

The support structure 38 of the sunvisor assembly 16 includes a base member 50 and an L-shaped shaft 52. The base member 50 is attached to at least the headliner 28 via a snap-fitting structure (not shown) and/or a fastener (not shown). The base member 50 also includes a shaft support portion 50a (also referred to as a first shaft receiving section 50a). An upper portion of the shaft support portion 50a of the base member 50 is also attach to the forward roof bow 24 of the vehicle body structure 12 Specifically, as shown in FIG. 2, the support structure 38 is attached to the forward roof bow 24 of the vehicle body structure 12 at a location that is adjacent to a first area 20a of a windscreen 20 of the vehicle body structure 12.

Figure 6:
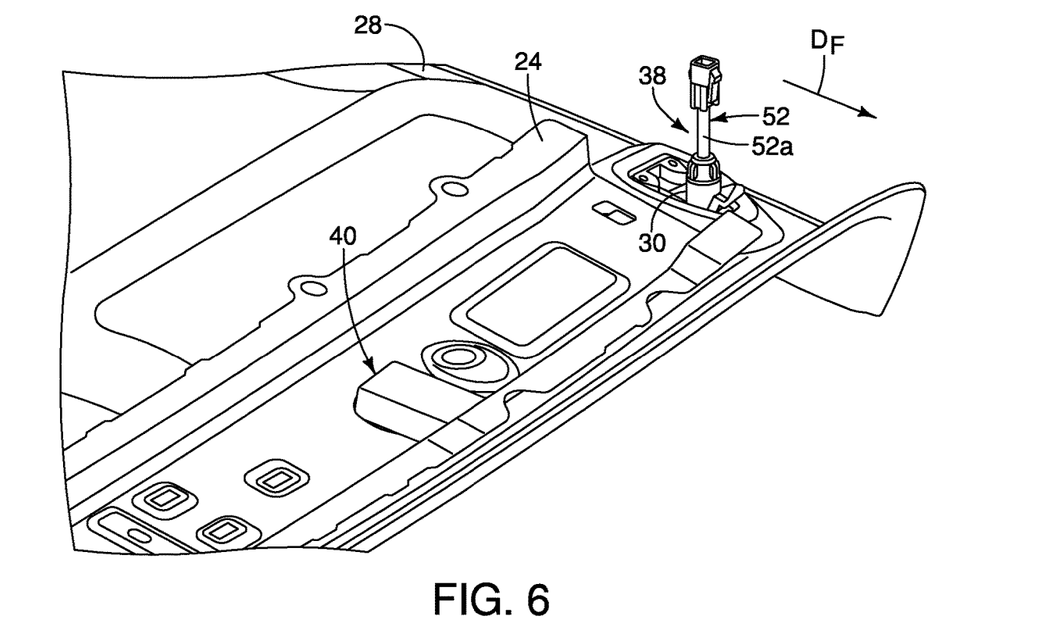
FIG. 6 is a perspective view of a portion of the headliner removed from the vehicle further showing the energy absorbing structure and the support structure of the sunvisor assembly in accordance with the first embodiment.

As shown in FIGS. 3, 4 and 6, the L-shaped shaft 52 has a first portion 52a and a second portion 52b. The first portion 52a extends through the support structure 38 and is supported therein for pivotal movement about the upright axis $A_1$. The upright axis $A_1$ does not need to be vertical, but can be slightly inclined relative to vertical, depending upon the overall shape and design of the vehicle body structure 12 of the vehicle 10. In the depicted embodiment, the upright axis $A_1$ is included relative to vertical by an angle that is approximately 5 degrees relative to vertical but can be anywhere between 0 and 10 degrees.

The second portion 52b of the L-shaped shaft member 50 along with the first end 44 of the sunvisor panel 36 define the offset axis $A_2$ such that the sunvisor panel 36 pivots about the offset axis $A_2$ and the second portion 52b of the L-shaped shaft member 52.

The first portion 52a and the second portion 52b of the L-shaped shaft member 52 define an angle α therebetween that is between 80 and 100 degrees. However, in the depicted embodiment, the angle α is approximately 90 degrees or can be slightly larger than 90 degrees, depending upon the design of the vehicle body structure 12 of the vehicle 10.

The first portion 52a of the L-shaped shaft member 52 extends through the base member 50 and into the shaft support portion 50a of the support structure 38. The upright axis $A_1$ is defined by the first shaft receiving section 50a with the first portion 52a of the L-shaped shaft 52 being retained within the first shaft receiving section 50a for pivotal movement in a conventional manner.

The second portion 52b of the L-shaped shaft member 52 extends into an opening (not shown) in the first end 44 of the sunvisor panel 36 and into a second shaft receiving section 60 of the sunvisor panel 36, as shown in phantom in FIG. 3.

Hence, the sunvisor panel 36 can undergo pivotal movement about the offset axis $A_2$ via the attachment to the second portion 52b of the L-shaped shaft 52.

In the depicted embodiment, the first attachment end 48 at the second end 46 of the sunvisor panel 36 is a pivot pin (hereinafter the pivot pin 48) that can be aligned with the offset axis $A_2$. In the depicted embodiment, the pivot pin 48 is separate and spaced apart from the second portion 52b of the L-shaped shaft member 52. More specifically, in the depicted embodiment, the second portion 52b is formed of a plastic or polymer material and is formed unitarily with the sunvisor panel 36.

However, in a first alternative embodiment (not shown) the pivot pin 48 can be part of the L-shaped shaft member 52 and is a distal end of the second portion 52b of the L-shaped shaft 52. Still further, in a further alternative embodiment, the pivot pin 48 is separate from the L-shaped shaft member 52 and is not aligned with the second axis $A_2$.

A description of the energy absorbing structure 40 is now provided with specific reference to FIGS. 2-3 and 6-14. The energy absorbing structure 40 installed to the vehicle body structure 12 adjacent to a second area 20b of the windscreen 20 spaced apart from the first area 20a, as indicated in FIG. 2 and shown in FIG. 2.

The energy absorbing structure 40 includes a housing 60, a biasing member 62 within the housing 60 and a downwardly extending projection 64.

Figure 7:
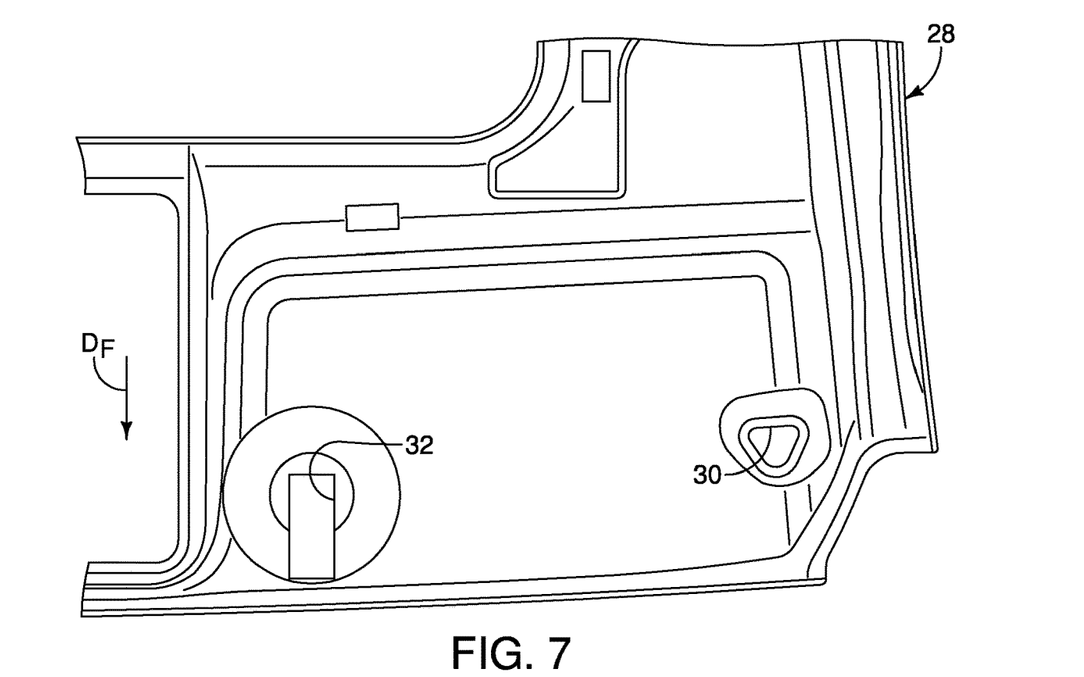
FIG. 7 is a top view of the portion of the headliner shown in FIG. 6 with the energy absorbing structure and the support structure of the sunvisor assembly removed in accordance with the first embodiment.
Figure 9:
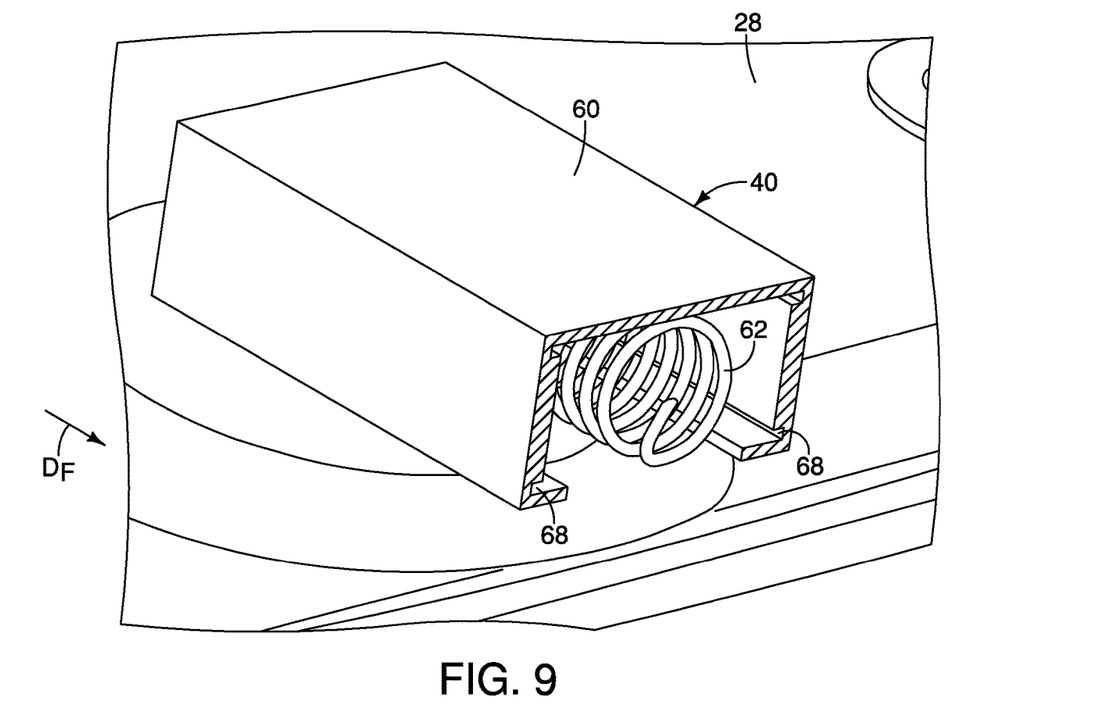
FIG. 9 is a cross-sectional view of the energy absorbing structure taken along the line 9-9 in FIG. 8 showing a biasing spring within a housing and tracks defined along lower interior sides of the housing in accordance with the first embodiment.
Figure 10:
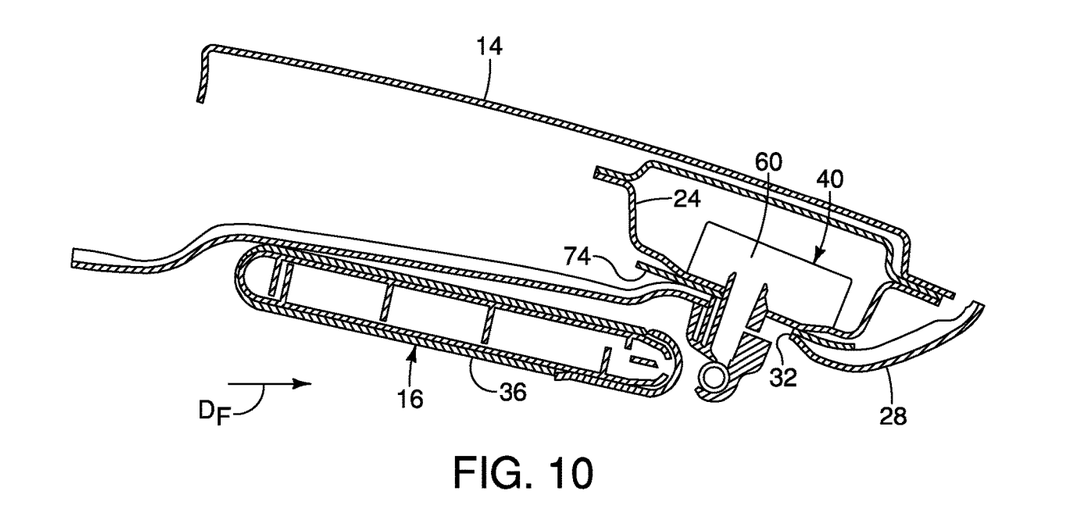
FIG. 10 is a cross-sectional view of the sunvisor assembly taken along the line 10-10 in FIG. 8 showing the housing and a downwardly extending projection of the housing of the energy absorbing structure in accordance with the first embodiment.
Figure 11:
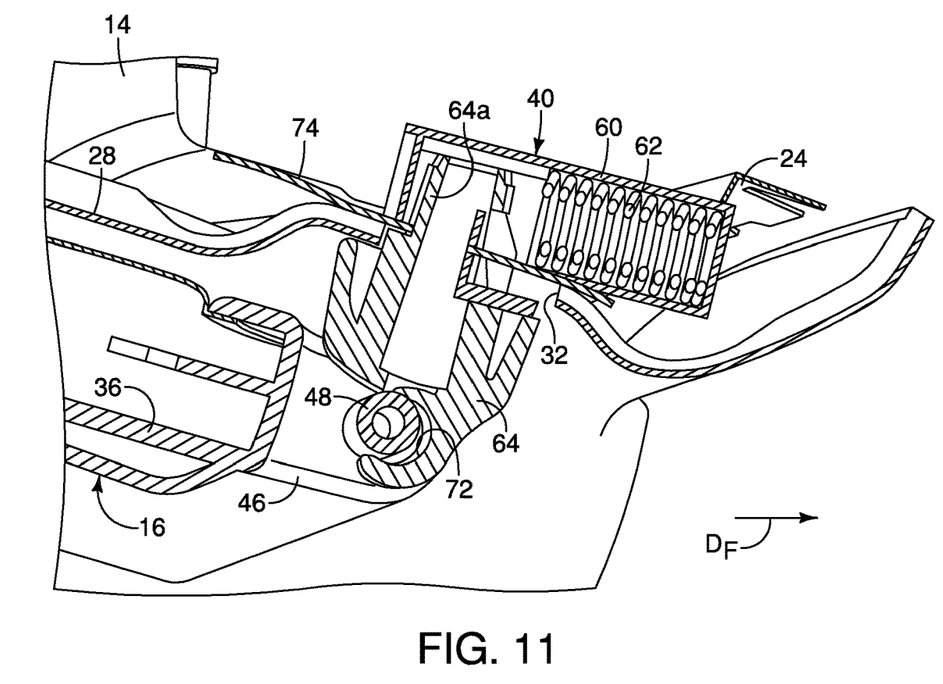
FIG. 11 is another cross-sectional view of a portion of the sunvisor assembly depicted in FIG. 10 showing further details of the housing, a spring within the housing and a downwardly extending projection of the energy absorbing structure in accordance with the first embodiment.
Figure 12:
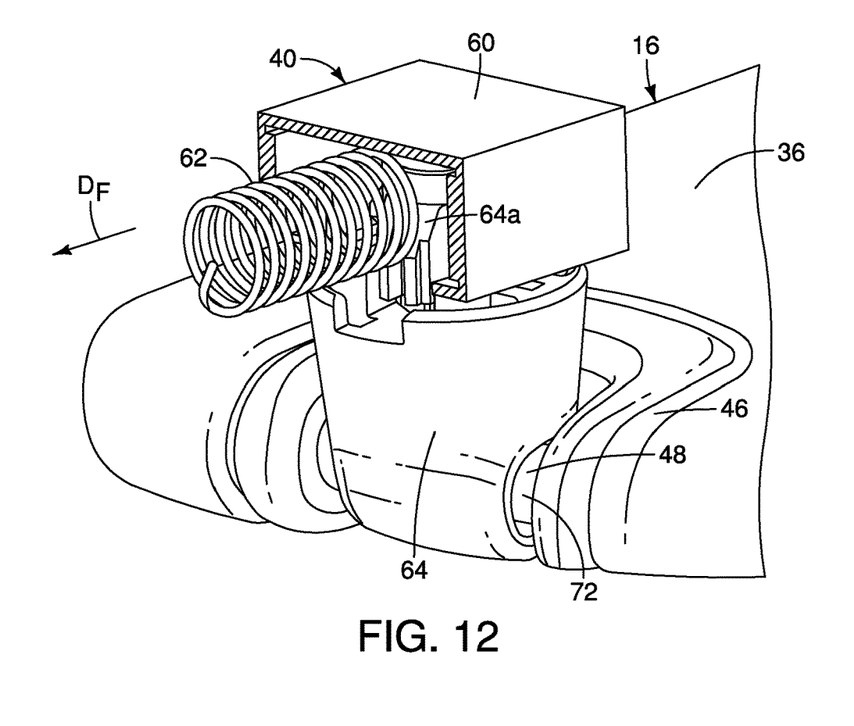
FIG. 12 is a cross-sectional view of the energy absorbing structure taken along the line 12-12 in FIG. 8 showing the biasing spring within the housing and the tracks defined along lower interior sides of the housing in accordance with the first embodiment.
Figure 13:
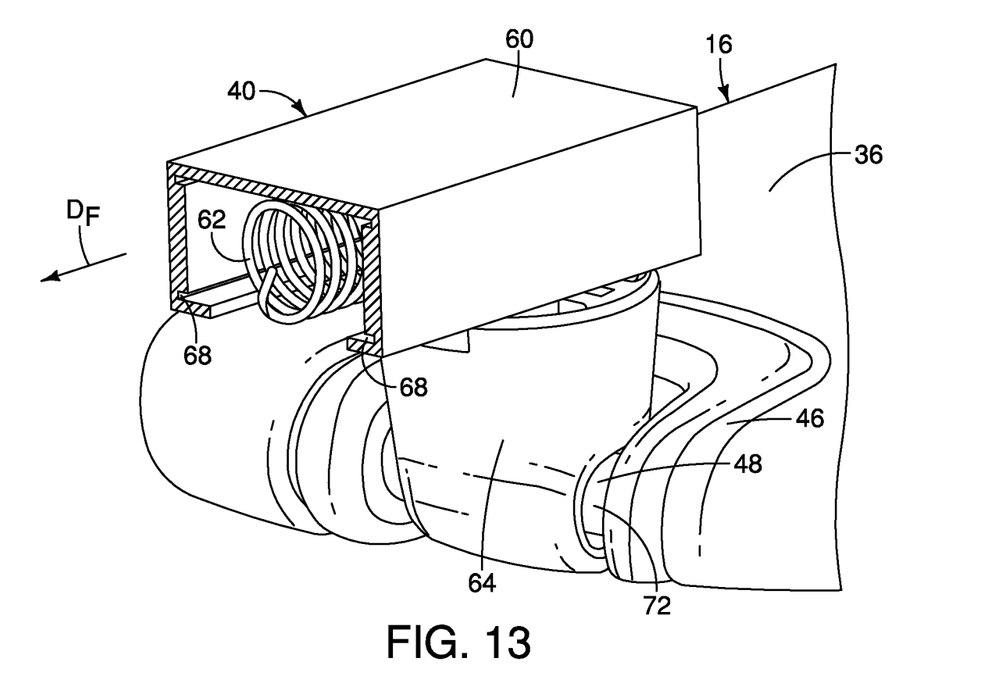
FIG. 13 is a cross-sectional view of the energy absorbing structure taken along the line 13-13 in FIG. 8 showing the biasing spring within the housing and the tracks defined along lower interior sides of the housing in accordance with the first embodiment.
Figure 14:
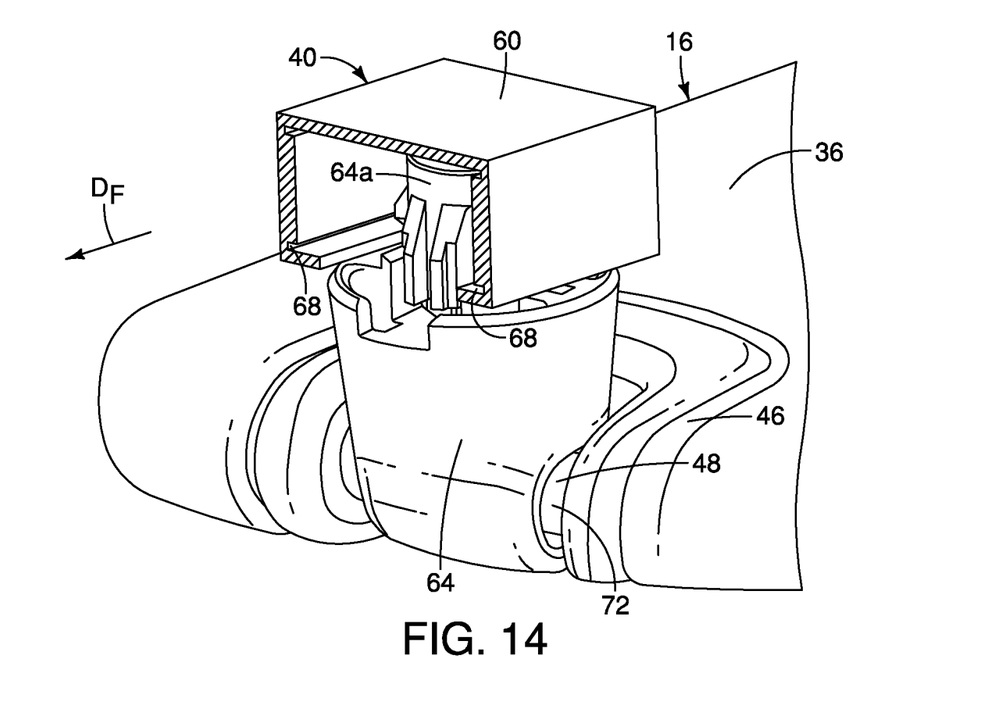
FIG. 14 is a cross-sectional view of the energy absorbing structure taken along the line 14-14 in FIG. 8 showing the biasing spring within the housing and the tracks defined along lower interior sides of the housing in accordance with the first embodiment.
Figure 15:
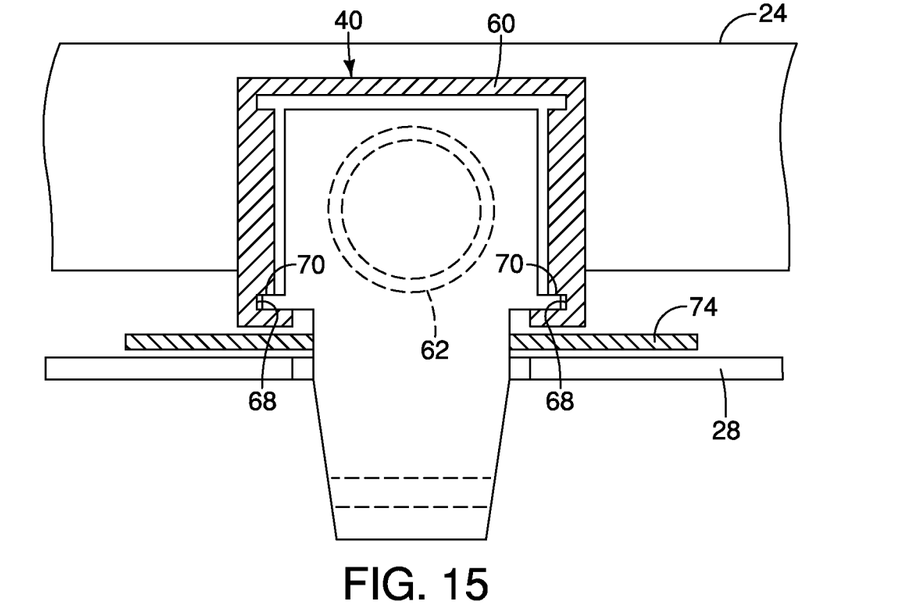
FIG. 15 is a cross-sectional view of the energy absorbing structure taken along the line 12-12 in FIG. 8 showing the biasing spring within the housing and the tracks defined along lower interior sides of the housing in accordance with the first embodiment.

As shown in FIGS. 6-7 and 9, the housing 60 is attached to the headliner 28 and as shown in FIGS. 10, 11 and 15 the housing 60 is also fixed to the forward roof bow 24. The housing 60 has an overall rectangular shape and is closed on all sides, except a bottom area thereof, as shown in FIGS. 9-15. The bottom area of the housing 60 includes a slot with the downwardly extending projection 64 extending downwardly therethrough. As shown in FIGS. 9 and 12-15, the lower inner side walls of the housing 60 includes opposing slots or tracks 68 that are dimensioned and shaped to receive projections or rails 70 that extend from opposite side of an upper end 64*a* of the downwardly extending projection 64. The arrangement of the tracks 68 and the rails 70 is such that the downwardly extending projection 64 can freely slide within the housing 60.

The biasing member 62 is installed within the housing 60 between the forward end of the housing and the upper end 64*a* of the downwardly extending projection 64. The biasing member 62 biases the downwardly extending projection 64 toward a rearward end of the housing 60, as shown in FIG. 11. The biasing member 62 can be any elastically compressible material. However, in the depicted embodiment, the biasing member 62 is a coil spring.

The downwardly extending projection 64 extends through the elongated slot 32 in the headliner 28 and includes a second attachment end 72. The upper end 64*a* of the downwardly extending projection 64 is substantially located within the housing 60. The lower portion of the downwardly extending projection 64 extends downward, through the elongated slot 32 of the headliner 28 and further through an opening in a shield member 74 (described in greater detail below).

The second attachment end 72 of the downwardly extending projection 64 can be a slot 72. The second attachment end 72 (the slot 72) is dimensioned and located such that the second attachment end 72 (the slot 72) defined proximate a lower end of the downwardly extending projection 64 is below the headliner 28 and is spaced apart from the headliner 28. In an at rest orientation shown in FIG. 11, the second attachment end 72 (slot 72) can easily receive the first attachment end 48 of the sunvisor panel 36. More specifically, the first attachment end 48 (pivot pin 48) can easily be snap-fitted into the second attachment end 72, in a conventional manner. In other words, the first attachment end 48 has an outer diameter that is slightly larger than the vertical height of the second attachment end 72 (the slot 72). A small amount of force is required to snap-fit the first attachment end 48 into the second attachment end 72 and remove the first attachment end 48 from the second attachment end 72.

A description of the shield member 74 is now provided with specific reference to FIGS. 10-11 and 15-16. The shield member 74 is basically a flexible panel member that is dimensioned to cover the elongated slot 32 regardless of the location of the downwardly extending projection 64. Specifically, the downwardly extending projection 64 can move from the at rest position depicted in FIGS. 10-11 to the forward position shown in phantom in FIG. 16, as is discussed in greater detail below.

The shield member 74 is attached to and moves with the downwardly extending projection 64. The shield member 74 includes a central opening dimensioned such that the downwardly extending projection 64 extends therethrough. The shield member 74 is located above the headliner 28 and slides along adjacent upper surface portions of the headliner 28 in response to movement of the downwardly extending projection 64.

Figure 16:
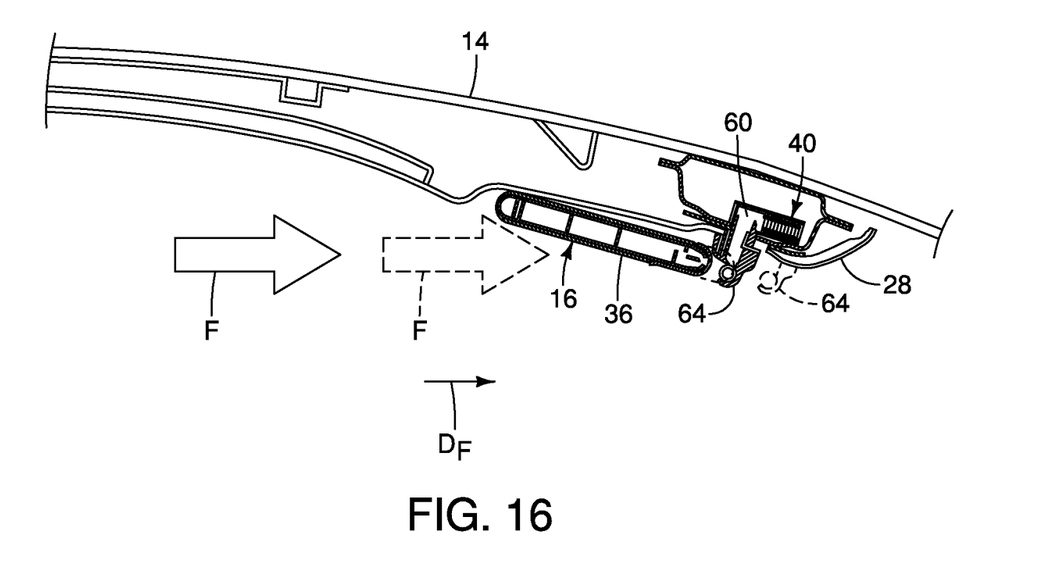
FIG. 16 is a side cross-sectional view of an arrow representing an object moving forward into contact with the sunvisor panel compressing the biasing member as forward momentum is transmitted to the biasing member in accordance with the first embodiment.

The energy absorbing structure 40 operates as follows, as represented in FIG. 16. When an object represented by the arrow F is seated in a front seat area of the vehicle 10, the object F might be located at a level that is higher than or about the same height as the sunvisor panel 36, with the sunvisor panel 36 is a stowed and at rest orientation, as shown in FIGS. 10, 11 and 16. In the event of a sudden stop or an impact event, the object represented by the arrow F might suddenly move forward contacting the sunvisor panel 36. In this circumstance, the sunvisor panel 36 can move forward due to forward momentum, absorbing some of the forward energy of the movement of the object F. Forward movement (forward momentum) of the sunvisor panel 36 further causes forward energy to move the downwardly extending projection 64 forward along the tracks 68 in the housing 60 transmitting energy to the biasing member 62, causing the biasing member 62 to compress.

Second Embodiment

Figure 17:
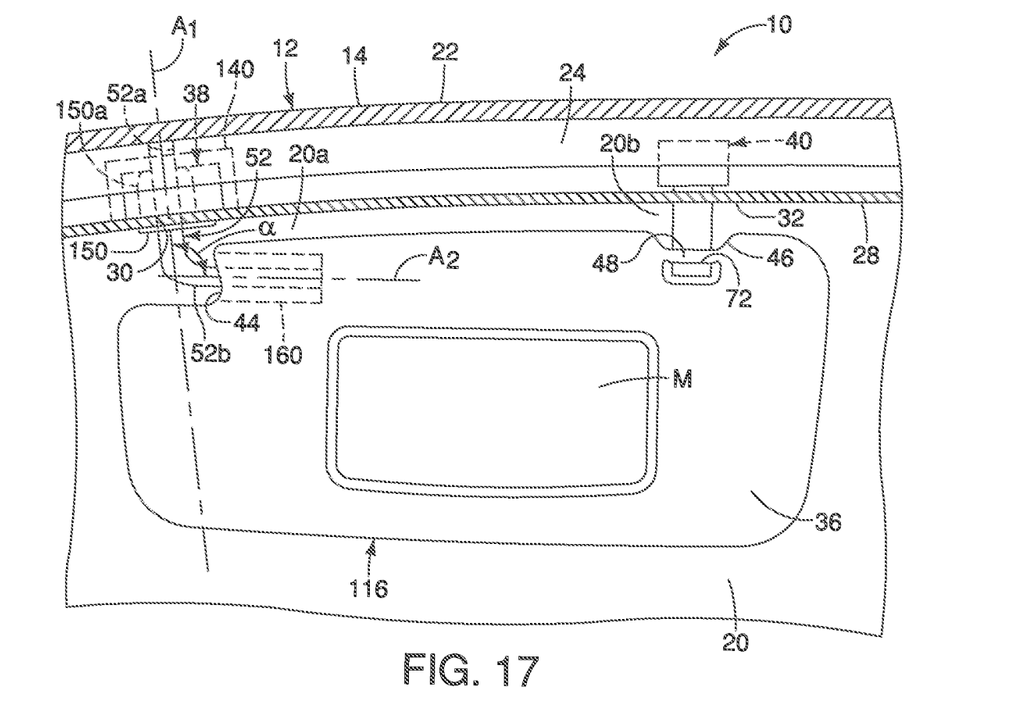
FIG. 17 is a rear cross-sectional view of a roof structure of the vehicle showing details of a support structure and a second energy absorbing structure of a sunvisor assembly in accordance with a second embodiment.
Figure 18:
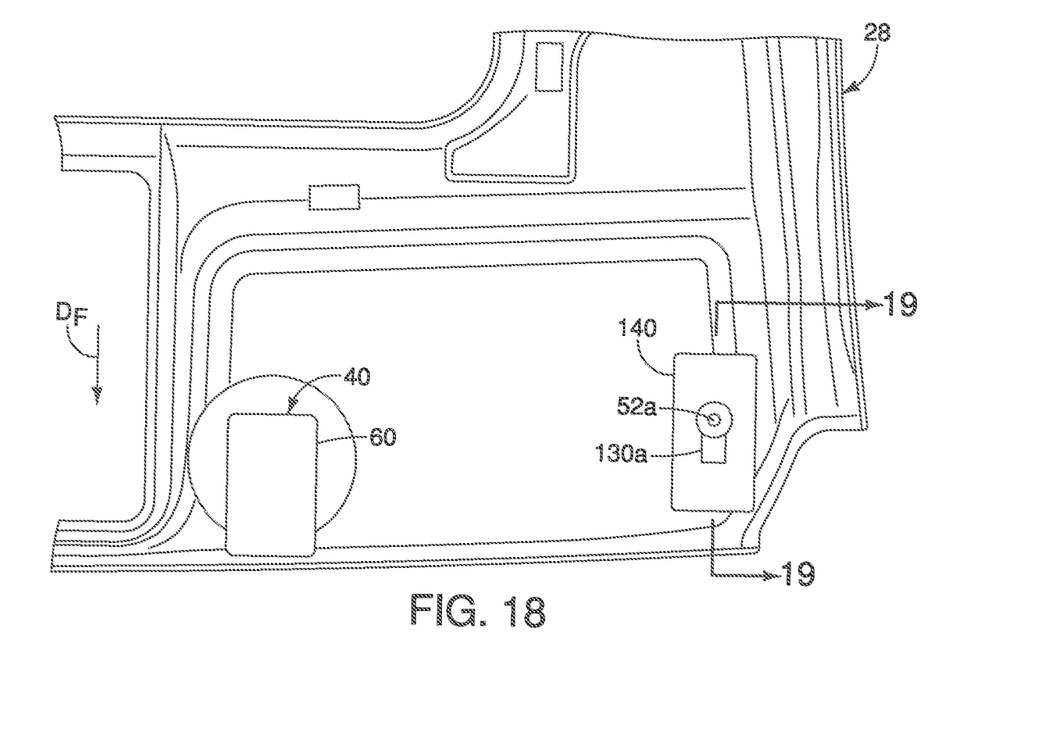
FIG. 18 is a top view of a portion of the headliner 7 with the second energy absorbing structure and the support structure of the sunvisor assembly installed to the headliner in accordance with the second embodiment.
Figure 19:
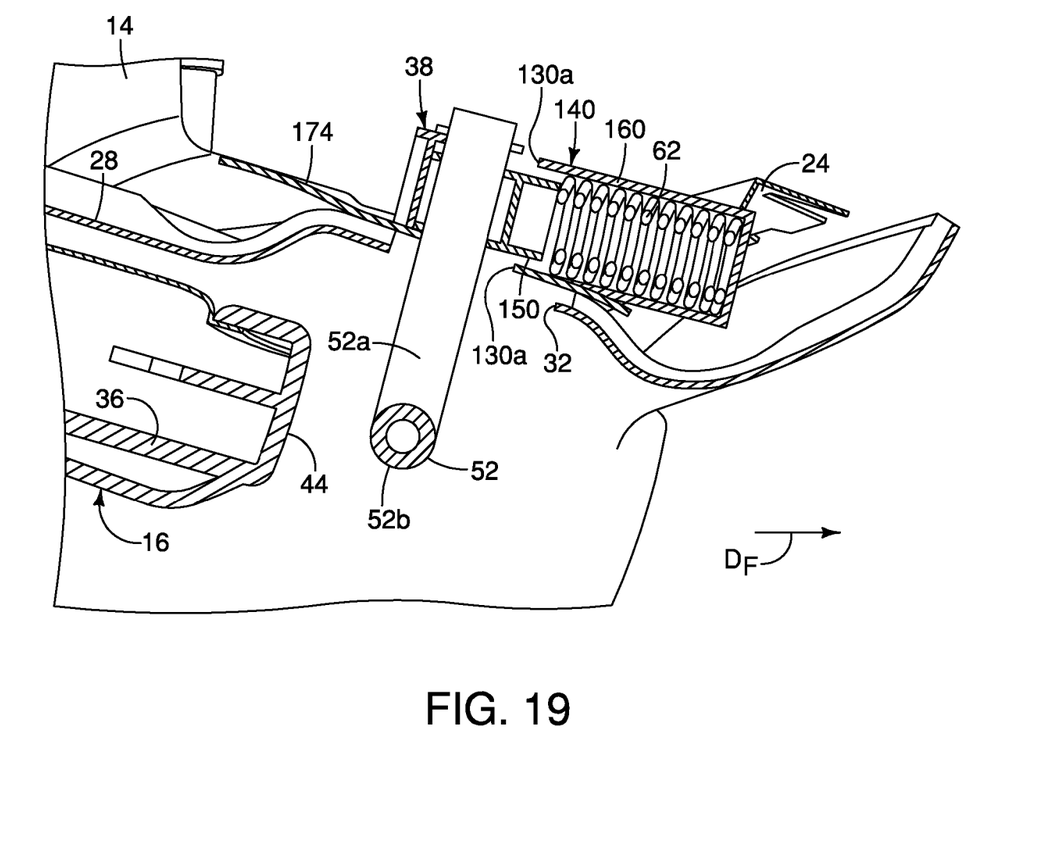
FIG. 19 is a cross-sectional side view of a portion of the sunvisor assembly taken along the line 19-19 in FIG. 18 showing further details of a housing and a spring within the housing of the energy absorbing structure and the support structure of the sunvisor assembly in accordance with the second embodiment.

Referring now to FIGS. 17-19, a sunvisor assembly 116 in accordance with a second embodiment will now be explained. In view of the similarity between the first and second embodiments, the parts of the second embodiment that are identical to the parts of the first embodiment will be given the same reference numerals as the parts of the first embodiment. Moreover, the descriptions of the parts of the second embodiment that are identical to the parts of the first embodiment may be omitted for the sake of brevity.

The sunvisor assembly 116 has all of the features of the sunvisor assembly 16 of the first embodiment, including the sunvisor panel 36, the L-shaped shaft 52, the roof structure 14, the headliner 28, etc. In the second embodiment, the sunvisor 116 further includes an energy absorbing structure 140 that is installed over an opening or slot 130*a* as shown in FIGS. 17 and 19. The upper end or first portion 52*a* of the L-shaped shaft 52 is supported by a base member 150 having a first shaft receiving section 150*a*. The base member 150 and the first shaft receiving section 150*a* are slidably supported within a housing 160 of the energy absorbing structure 140. The housing 160 is supported by the forward roof bow 24 and the headliner 28, The energy absorbing structure 140 is configured to absorb forward energy resulting from forward energy being applied to the first end 44 of the sunvisor panel 36 by an object, as explained in the first embodiment. Specifically, movement of the sunvisor panel 36 in the forward direction DF from forward energy or momentum is transmitted through the L-shaped shaft 52 to the base member 150 and the first shaft receiving section 150*a* that then compress the biasing spring 62 disposed within a housing 160 of the energy absorbing structure 140. The upper and lower walls of the housing 140 are provided with slot 130*a*, as shown in FIGS. 18 and 19 such that the first portion 52*a* of the L-shaped shaft 52 can slide relative to the fixed housing 160 in response to force (forward momentum) being applied thereto.

The vehicle body structure includes features, devices and structure are conventional components that are well known in the art. Since these features, devices and structure are well known in the art, these features, devices and structures will not be discussed or illustrated in detail herein. Rather, it will be apparent to those skilled in the art from this disclosure that the components can be any type of structure and/or programming that can be used to carry out the present invention.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiments, the following directional terms "forward", "rearward", "above", "downward", "vertical", "horizontal", "below" and "transverse" as well as any other similar directional terms refer to those directions of a vehicle equipped with the vehicle sunvisor assembly. Accordingly, these terms, as utilized to describe the present invention should be interpreted relative to a vehicle equipped with the vehicle sunvisor assembly.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such features. Thus, the foregoing descriptions of the embodiments according to the present invention are provided for illustration only, and not for the purpose of limiting the invention as defined by the appended claims and their equivalents.

What is claimed is:

1. A vehicle sunvisor assembly, comprising:
   a support structure attached to a vehicle body structure adjacent to a first area of a windscreen of the vehicle body structure;
   a sunvisor panel having a first end and a second end, the first end being supported by the support structure for pivotal movement about an upright axis and movement about an offset axis that is not parallel to the upright axis, the second end having a first attachment end; and
   an energy absorbing structure installed to the vehicle body structure adjacent to a second area of the windscreen spaced apart from the first area and having a downwardly extending projection with a second attachment end that aligns with the first attachment end with the sunvisor panel pivoted to the first attachment end, the energy absorbing structure including a hollow housing with a pair of tracks defined along opposite sides thereof, the downwardly extending projection includes an upper base portion that includes a pair of opposing rails that extend from opposite sides thereof, the opposing rails being slidably disposed within pair of tracks within the hollow housing, and the energy absorbing structure being configured to absorb energy from an object moving in a forward direction contacting the sunvisor panel with the first attachment end being attached to the second attachment end.

2. The vehicle sunvisor assembly according to claim 1, wherein
   the first attachment end is a pivot pin aligned with the offset axis and the second attachment end is a slot that snap-fits to the pivot pin.

3. The vehicle sunvisor assembly according to claim 1, wherein
   the support structure includes a first shaft receiving section that receives and supports a first portion of an L-shaped shaft member for pivotal movement about the upright axis.

4. The vehicle sunvisor assembly according to claim 3, wherein
   the first end of the sunvisor panel is supported by the support structure for pivotal movement about the upright axis, and
   the L-shaped shaft member includes a second portion that defines the offset axis with the sunvisor panel also being pivotal about the second portion of the L-shaped shaft member and the offset axis.

5. The vehicle sunvisor assembly according to claim 4, wherein
   the first portion of the L-shaped shaft member and the second portion of the L-shaped shaft member define an angle therebetween that is between 80 and 100 degrees.

6. The vehicle sunvisor assembly according to claim 5, wherein
   the first portion of the L-shaped shaft member and the second portion of the L-shaped shaft member define an angle therebetween that is 90 degrees.

7. The vehicle sunvisor assembly according to claim 6, wherein
   the first attachment end is a pivot pin aligned with the offset axis and the second attachment end is a slot that snap-fits to the pivot pin, and
   the pivot pin is aligned with the offset axis and the second portion of the L-shaped shaft member.

8. The vehicle sunvisor assembly according to claim 1, wherein
   the vehicle body structure includes a roof structure and a headliner that is installed along an interior side of the roof structure.

9. The vehicle sunvisor assembly according to claim 8, wherein
   the energy absorbing structure is fixed to the roof structure above the headliner, and
   the headliner includes an elongated slot with the downwardly extending projection extending through the elongated slot.

10. The vehicle sunvisor assembly according to claim 9, wherein
    the energy absorbing structure includes a shield member connected to the downwardly extending projection for movement therewith such that the elongated slot is shielded by the shield member regardless of the position of the downwardly extending projection.

11. The vehicle sunvisor assembly according to claim 1, wherein
    the hollow housing of the energy absorbing structure includes a biasing member contacting an upper base portion of the downwardly extending projection such that in response to receiving energy from the object moving in a forward direction, the biasing member is compressed as the downwardly extending projection moves in the forward direction.

12. The vehicle sunvisor assembly according to claim 11, wherein
the biasing member is a coil spring.

13. The vehicle sunvisor assembly according to claim 12, wherein
the support structure includes a second energy absorbing structure having a second hollow housing attached to the vehicle body structure adjacent to the first area of the windscreen.

14. The vehicle sunvisor assembly according to claim 13, wherein
the second hollow housing of the second energy absorbing structure includes a second biasing member that contacts a shaft support member of the support structure such that in response to receiving energy from the object moving in the forward direction, the second biasing member is compressed as the shaft support member moves in the forward direction.

* * * * *